(12) United States Patent
John et al.

(10) Patent No.: US 10,068,468 B2
(45) Date of Patent: Sep. 4, 2018

(54) CONTROL SYSTEM FOR AN OUTDOOR COMMUNICATION SYSTEM

(71) Applicant: General Electric Company, Schenectady, NY (US)

(72) Inventors: Ashbeel Younas John, Lachine (CA); Louis Bacon, Lachine (CA); Youcef Chaoua, Lachine (CA); Justin E. Foster, Cleveland, OH (US); Victor Ion Isac, Montreal (CA)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 15/368,711

(22) Filed: Dec. 5, 2016

(65) Prior Publication Data

US 2017/0178497 A1    Jun. 22, 2017

Related U.S. Application Data

(60) Provisional application No. 62/268,485, filed on Dec. 16, 2015.

(51) Int. Cl.
| | | |
|---|---|---|
| *G08G 1/005* | (2006.01) | |
| *G08C 17/02* | (2006.01) | |
| *G08G 1/07* | (2006.01) | |
| *H04Q 9/14* | (2006.01) | |
| *H05B 37/02* | (2006.01) | |

(52) U.S. Cl.
CPC ............. *G08G 1/005* (2013.01); *G08C 17/02* (2013.01); *G08G 1/07* (2013.01); *H04Q 9/14* (2013.01); *H05B 37/0272* (2013.01); *H04Q 2213/13097* (2013.01)

(58) Field of Classification Search
CPC ............ H05B 37/0218; H05B 37/0254; H05B 37/0272; H05B 33/0854; H05B 33/0842; H05B 33/0803; F21V 23/0442; F21V 23/007; F21V 23/0435; F21V 29/506; F21V 19/001; F21Y 2115/10; F21Y 2113/13
See application file for complete search history.

(56) References Cited

U.S. PATENT DOCUMENTS

| | | |
|---|---|---|
| 1,932,044 A | 10/1933 | Mylius |
| 2,030,094 A | 2/1936 | Bradshaw et al. |
| 2,313,881 A | 3/1943 | Lewis |
| 2,461,247 A | 2/1949 | Wormull |

(Continued)

FOREIGN PATENT DOCUMENTS

WO    2013159833 A1    10/2013

OTHER PUBLICATIONS

European Search Report and Opinion issued in connection with corresponding EP Application No. 16203318.7 dated May 8, 2017.

(Continued)

*Primary Examiner* — Haissa Philogene
(74) *Attorney, Agent, or Firm* — Peter T. DiMauro (57) ABSTRACT

Provided is a control system for an outdoor communication system mounted to a fixture of the outdoor communication system that includes at least one sensor configured to sense and perform wireless communication, and a cover formed at least partially transparent and configured to house the at least one sensor and transmit signals through the cover for wireless communication with the outdoor communication system.

17 Claims, 5 Drawing Sheets

(56) References Cited

U.S. PATENT DOCUMENTS

| | | | |
|---|---|---|---|
| D213,466 S | 3/1969 | Moran | |
| D343,803 S | 2/1994 | Poleshuk et al. | |
| D348,017 S | 6/1994 | Poleshuk et al. | |
| D354,113 S | 1/1995 | Nortier et al. | |
| D381,281 S | 7/1997 | Miller et al. | |
| D412,859 S | 8/1999 | Thiel | |
| D429,655 S | 8/2000 | Cowan et al. | |
| 6,688,327 B1 | 2/2004 | Baker | |
| D596,570 S | 7/2009 | Spivey | |
| 7,569,802 B1 | 8/2009 | Mullins | |
| 7,821,776 B2 | 10/2010 | Loy et al. | |
| 7,874,709 B1 * | 1/2011 | Beadle | F21S 8/022 362/285 |
| 8,033,686 B2 * | 10/2011 | Recker | H05B 33/0803 362/249.02 |
| 8,823,277 B2 * | 9/2014 | Chemel | H05B 37/029 315/152 |
| 9,526,142 B2 * | 12/2016 | Schroder | H05B 37/0218 |
| 2004/0192415 A1 | 9/2004 | Luglio et al. | |
| 2010/0029268 A1 | 2/2010 | Myer et al. | |
| 2011/0060701 A1 | 3/2011 | Verfuerth et al. | |
| 2012/0040606 A1 | 2/2012 | Verfuerth | |
| 2012/0139426 A1 | 6/2012 | Ilyes et al. | |

OTHER PUBLICATIONS

U.S. Notice of Allowance issued in connection with Related U.S. Appl. No. 29/601,620 dated Aug. 4, 2017.

* cited by examiner

CONTROL SYSTEM FOR AN OUTDOOR COMMUNICATION SYSTEM

CROSS-REFERENCES

The present invention is a non-provisional application claiming priority to Provisional Application No. 62/268,485 and Design Application No. 29/548,803 both filed on Dec. 16, 2015, the disclosures of which are incorporated by reference herein in their entirety.

TECHNICAL FIELD

The present invention relates generally to an outdoor communication system (e.g., an outdoor lighting system or traffic controllers). In particular, the present invention relates to a control system for obtaining color appearance of an outdoor communication system.

BACKGROUND

An outdoor lighting system, such as a roadway/outdoor lighting system, includes one or more lighting fixtures, each fixture typically providing illumination to surroundings within close proximity thereof. Such lighting fixtures can be found along the streets and street corners, and at roadway intersections.

The lighting fixtures also provide visibility during nighttime hours for security and safety purposes. These fixtures are generally positioned along streets and highways to enable pedestrian traffic and vehicle traffic to safely navigate the roadway after hours and in low lit areas.

Figure 1:
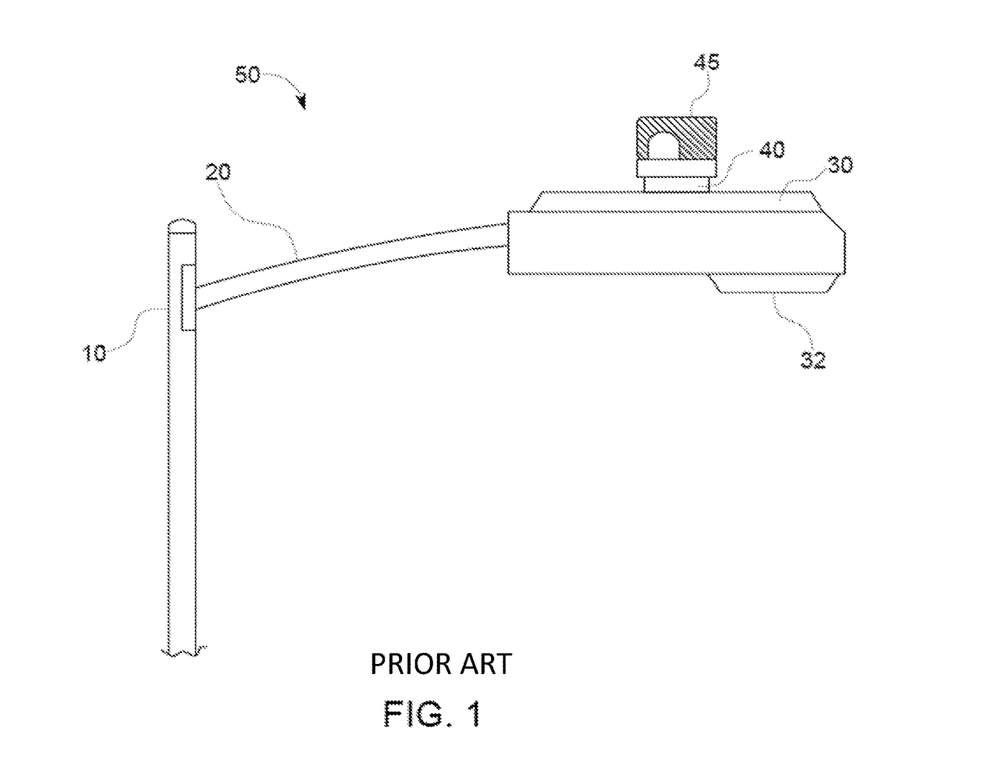
FIG. 1 is a schematic illustrating a conventional outdoor lighting system.

The lighting fixtures are typically mounted on street poles as shown in FIG. 1. FIG. 1 depicts a conventional roadway outdoor lighting system 50, including a pole 10, a mast arm 20 connected to the pole 10 at a proximal end. Also, included is a lighting fixture 30 physically coupled to a distal and of the mast arm 20. The roadway outdoor lighting system 50 is typically disposed in the ground at a bottom of the pole 10.

The mast arm 20 includes electrical wiring for connecting and energizing the lighting fixture via a utility grid. The lighting fixture 30 typically includes a lighting device 32 and a connector 40 (e.g., a NEMA® socket) at a top surface thereof for connecting to a control system including housing having a wireless node or photocell 45 for controlling the lighting fixture 30.

The poles of the roadway/street lighting systems are increasingly being used to perform other functions such as remote monitoring, utility energy management and global positioning system (GPS) mapping, in addition to providing lighting. Therefore, the wireless node needs to be colored per necessary requirements and capable of allowing communication at various frequencies.

The housing of the wireless node is typically formed with two or more plastic components (e.g., a window and a cover as shown in FIG. 1). The components can be attached together via mechanical fixation or manufacturing methods such as ultrasonic welding or snaps. The node allows light spectrum display and sensing through the window.

There are several challenges associated with the mechanical design and the manufacturing thereof since unfavorable environmental factors (e.g., temperature conditions, or wind or other environmental conditions) can diminish performance. Therefore, additional components (e.g., gaskets and other hardware) and manufacturing processes may be necessary that incur additional costs for attempting to mitigate the impact of an unfavorable environment, and provide a reliable outdoor wireless control system.

SUMMARY OF THE EMBODIMENTS

Given the aforementioned deficiencies, a need exists for more adaptable cover or housing for outdoor lighting control system for outdoor lighting systems.

Under certain circumstances, embodiments of the present invention provide a control system for an outdoor communication system mounted to a fixture of the outdoor communication system. The control system includes at least one sensor configured to sense and perform wireless communication, and a cover formed at least partially transparent and configured to house the at least one sensor and transmit signals through the cover for wireless communication with the outdoor communication system.

In another exemplary embodiment, a cover formed at least partially transparent for a control system of an outdoor communication system is provided. The cover includes a transparent colored polymeric based material configured to transmit signals therethrough from a wireless node housed therein.

In yet another exemplary embodiment, a method for obtaining a color appearance during control of an outdoor communication system having a fixture, wherein a control system is mounted to the fixture. The method includes providing a cover formed at least partially transparent for housing at least one sensor for performing sensing with the outdoor communication system, and performing ambient sensing and wireless communication by transmitting signals through the cover and wirelessly connecting the control system to the outdoor communication system to receive and transmit data from the outdoor communication system.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide a control system including a cover comprising a wireless node to an outdoor communication system (e.g., an outdoor lighting system or traffic control system). The control system can receive both power and data from the lighting fixture of the outdoor lighting system. The control system can be implemented within existing outdoor lighting systems and provides sensing and communication capabilities for example, for remote monitoring and operation of lighting devices within the outdoor lighting system, obtaining utility energy measurement data and performing GPS mapping of the lighting devices.

Figure 2:
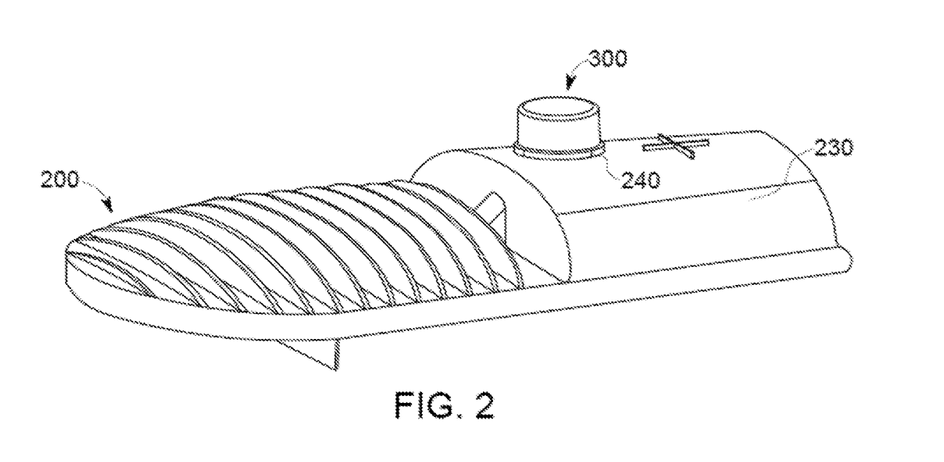
FIG. 2 is a schematic illustrating the control system for an outdoor lighting system that can be implemented within one or more embodiments.

FIG. 2 is a schematic illustrating the control system for an outdoor lighting system 200 that can be implemented within one or more embodiments. The outdoor lighting system 200 includes a connector or plug 240 at a top surface of the lighting fixture 230, and a web interface and external system for controlling the lighting system 200. According to one or more embodiments, the connector or plug 240 can be a NEMA® socket, two-prong or three-prong socket or any other type of connector suitable for the purposes set forth herein.

Figure 3A:
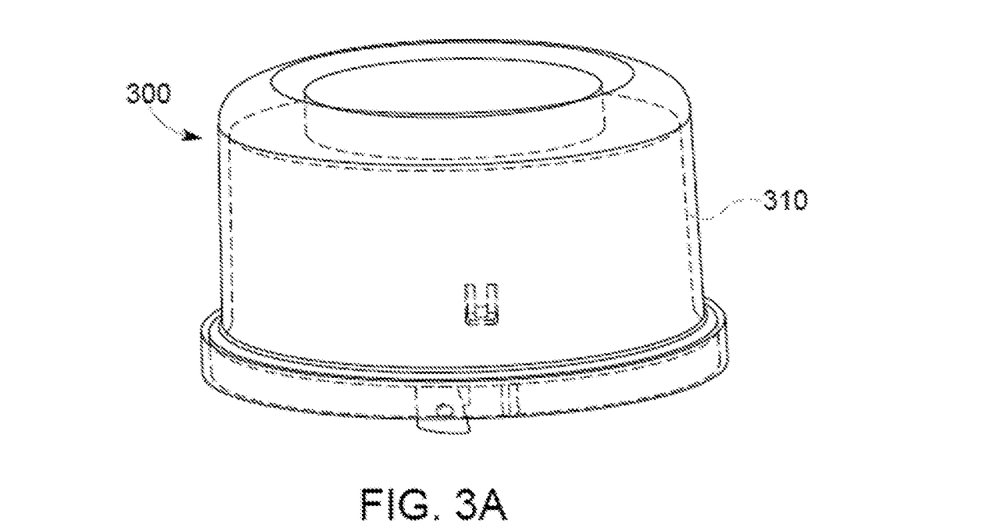
FIGS. 3A and 3B are schematics illustrating a cover of the control system shown in FIG. 2 that can be implemented within one or more embodiments of the present invention.
Figure 3B:
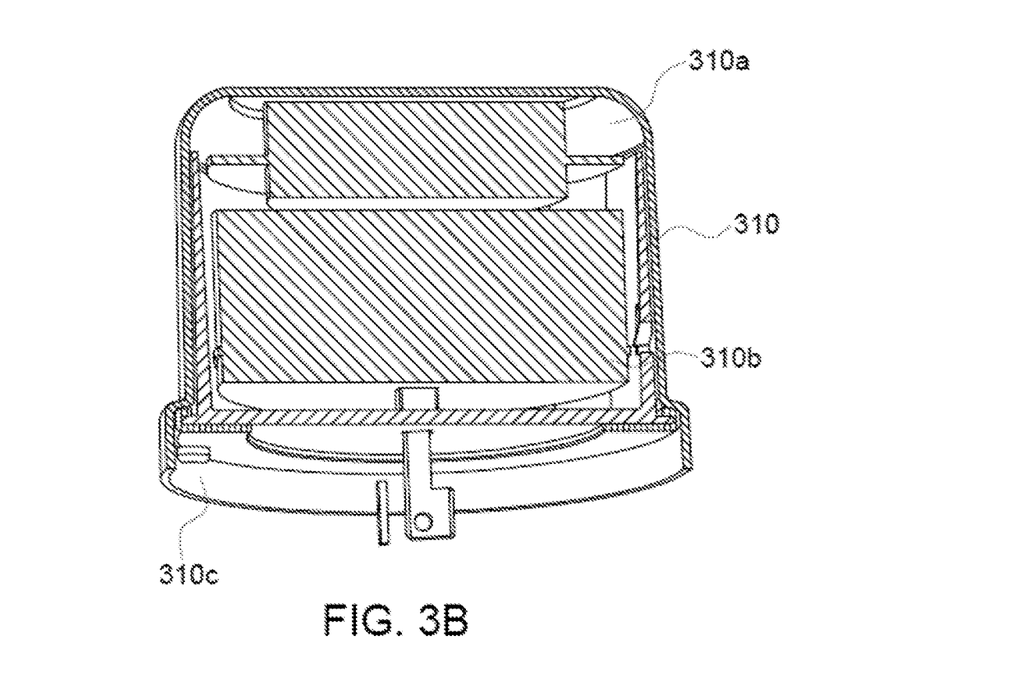

FIGS. 3A and 3B are schematics illustrating a cover of the control system shown in FIG. 2 that can be implemented within one or more embodiments of the present invention.

FIG. 3A depicts a control system 300 mounted to the connector or plug 240 in accordance with one or more embodiments of the present invention. The control system 300 can be connected by a connector or other interface unit. The control system 300 includes a cover 310.

Figure 4:
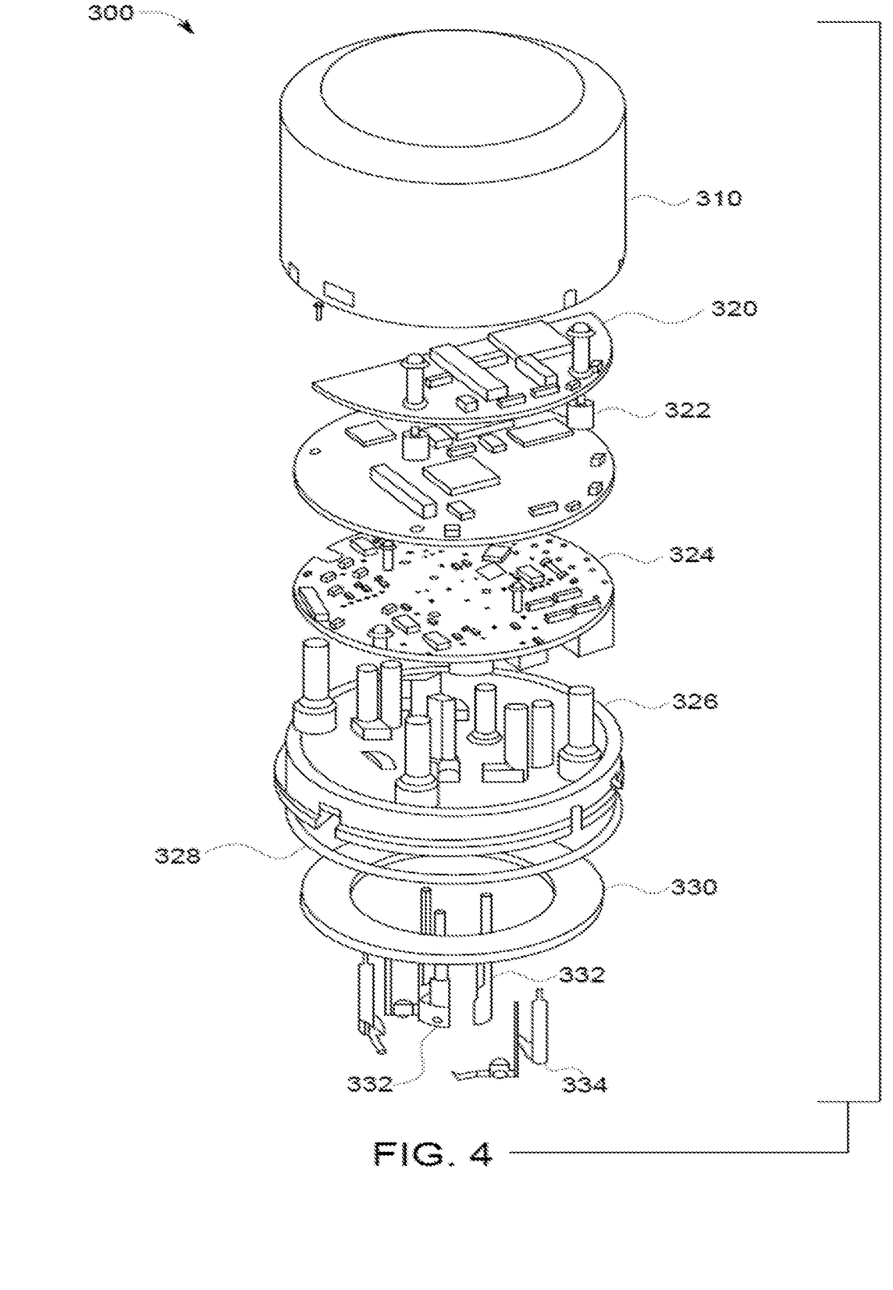
FIG. 4 is a detailed schematic illustrating the control system that can be implemented within one or more embodiments of the present invention.

The cover 310 is may be fully transparent or at least partially transparent. For example, it may be translucent and/or tinted. According to one or more embodiments, the transparent material can be a transparent polymeric based material. The cover 310 can appear to be black or another color while allowing flashing LEDs (as depicted in FIG. 4) of the control system 300 to communicate and the photosensor or node therein to operate. According to one or more embodiments, cover 310 is a single element which can include a window or recess that is integrally formed therein during manufacturing which is translucent to allow the photosensor or node therein to operate. Unlike the conventional housing shown in FIG. 1, the single cover 310 of the present invention therefore provides the advantage of preventing water ingress between separate components having to be sealed together during manufacturing.

FIG. 3B illustrates the interior areas of the cover 310. The interior areas include an upper portion 310a, a middle portion 310b and a bottom portion 310c. The upper portion 310a houses a main circuit board, photosensor or node and LEDs. The middle portion 310 houses the microprocessor/processing unit for the wireless node, and the lower portion 310c includes the contacts and power pins for connecting the node to the lighting fixture 230. Additional details for the components of the control system 300 will be discussed below with reference to FIG. 4.

As shown in FIG. 4, the control system 300 includes the cover 310, and a first circuit board 320 including a network interface unit (e.g., a network interface card) to perform communication with external systems, and other components. The first circuit board 320 also includes RF antenna and associated circuitry for operation thereof.

The control system 300 also includes a second circuit board 322 (i.e., the main board or motherboard), including a photosensor for performing ambient sensing, and at least one microprocessor/processing unit for performing calculations using information from the lighting system 200. The second circuit board 322 further includes at least one sensor and/or a plurality of LEDs, and a driver to control the LEDs. The LEDs indicate a state of the control system 300 such as, initialization, initialization failure, connection established, etc. The second circuit board 322 can perform auto detection to detect if the driver is a 0-10 Voltg type or a digital addressable lighting interface (DALI) interface.

As further discussed below in reference to FIG. 6, the first circuit board 320 and the second circuit board 322 can be combined into one single board in accordance with one or more embodiments.

The control system 300 further includes a power board assembly 324 can include a microprocessor/processing unit. The power board assembly 324 can be a power interface including a relay for completing the circuit with the lighting fixture 230 and operating as a lighting controller to turn the lighting fixture 230 on or off. The power board assembly 324 can also supply power to the lighting system 200. The power board assembly 324 can be an optional component and the node can receive power directly from the lighting driver of the lighting fixture 200. The control system 300 can also include an on-board microcontroller/processing unit, as well as an onboard GPS.

The control system 300 further includes a base portion 326 to be securely fitted to the cover 310 in a snap-fit manner, for example.

Additional components, including a sealing means (i.e., an o-ring) 328 and a gasket (i.e., a sponge gasket) 330 are provided to seal the connection between the control system 300 and the external connector 240 of the lighting fixture 230, as shown in FIG. 2.

Further, power pins 332 and contacts 334 are included to provide electrical connection between the lighting fixture 230 and the control system 300 via the external connector 240. The contacts 334 can include a USB for connecting to external sensors, and other components. The control system 300 can receive power from the lighting fixture 230 via a power circuit of the lighting fixture 230.

According to the embodiments, the one or more sensors can preferably include a sensor for obtaining external sensing data, for monitoring the system itself. The one or more sensors can also monitor air quality wind velocity, weather conditions, traffic conditions, and corrosion and vibration conditions in addition to controlling and monitoring the functions and power of the lighting system 200. The present invention is not limited to any particular sensor implementation.

The control system 300 can wirelessly communicate with the lighting system 200 via a wireless data source in accordance with alternative embodiments of the present invention. The wireless data source can be a radio frequency (RF), cellular, or any other type of robust wireless data source. If RF is used, alternatively the RF can be the wireless power source wirelessly connecting the control system 300 to the lighting fixture 230. The control system 300 can further wirelessly communicate with the lighting fixture 230 via a designated wireless data circuit.

The control system 300 can be in wireless communication with at least one external system (e.g., a computer system) for obtaining the sensing data to monitor and control the outdoor lighting system 200. The control system 300 can receive command signals from the external system and transmit the sensing data in response to the command signals received.

Figure 5:
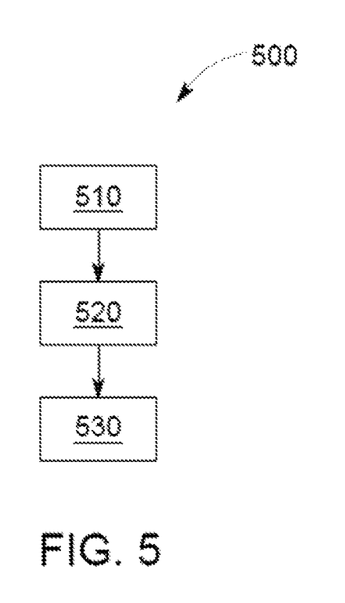
FIG. 5 is a flow chart illustrating a method of obtaining color appearance via the control system while performing sensing and communication between the control system and an outdoor lighting system that can be implemented within one or more embodiments of the present invention.

FIG. 5 is an exemplary illustration of a method 500 of obtaining color appearance via the control system while performing sensing and communication between the control system and an outdoor lighting system that can be implemented within one or more embodiments of the present invention. The method 500 begins at operation 510, providing a cover formed at least partially transparent for housing at least one sensor for performing sensing and wireless communication with the outdoor lighting system.

The method continues to operation 520 where the control system is physically connected with the lighting fixture.

At operation 530, the method continues by performing ambient sensing and wireless communication by transmitting signals through the cover and wirelessly connecting the control system to the outdoor lighting system to receive and transmit data from the outdoor lighting system.

Figure 6:
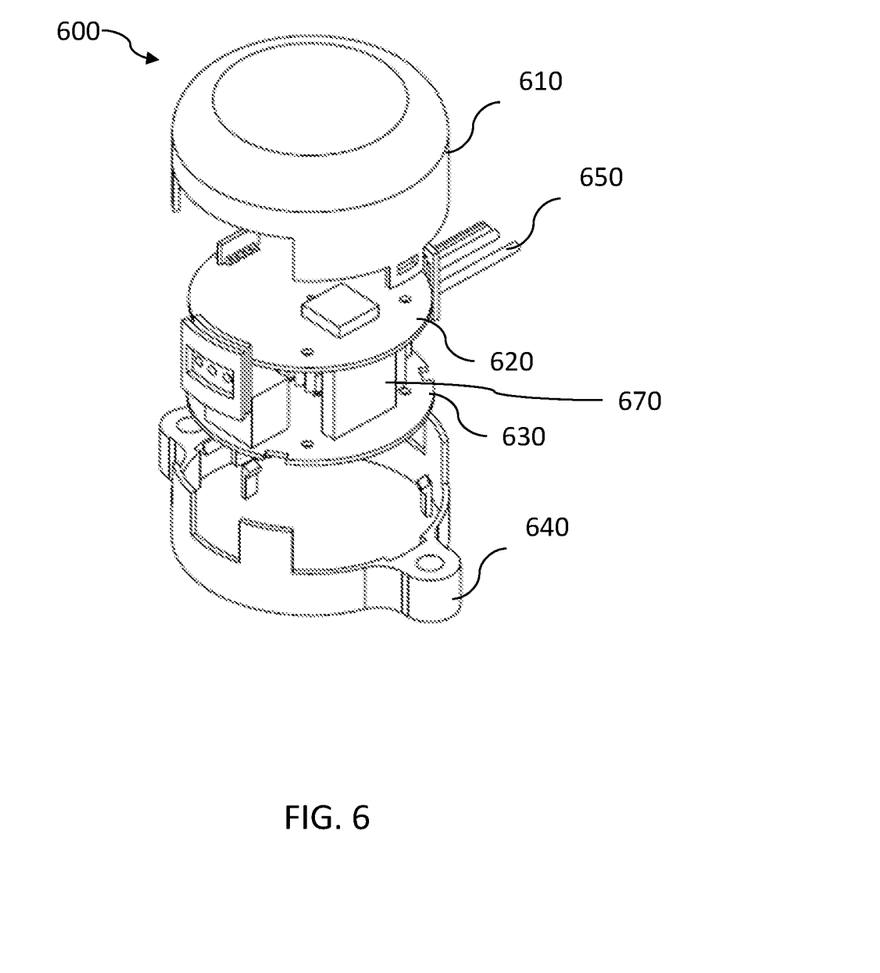
FIG. 6 is a detailed schematic illustrating the control system that can be implemented within one or more alternative embodiments of the present invention.

FIG. 6 is a detailed schematic illustrating the control system that can be implemented within one or more alternative embodiments of the present invention. In this embodiment of the present invention, the control system 600 is similar to the control system 300 except it can be disposed within the lighting fixture 230 in a more compact manner.

As shown in FIG. 6, the control system (i.e., the node) 600 includes a cover 610 to house a PCB stack that includes a circuit board 620 which is similar to the first circuit board 320 and the second circuit board 322 (as depicted in FIG. 4) combined together into one circuit board including a network interface unit (e.g., a network interface card) to perform communication with external systems, and other components and associated RF circuitry for operation of an RF antenna which can be disposed on top of the cover 610 in accordance with one or more embodiments. The board 620 also includes at least one microprocessor/processing unit for performing calculations using information from the lighting system 200 and at least one sensor and/or a plurality of LEDs, and a driver to control the LEDs.

A power board assembly 630 is similar to the power board assembly 324 (as depicted in FIG. 3) and includes a relay for completing the circuit with the lighting fixture 230 and operates as a lighting controller to turn the lighting fixture 230 on or off. The power board assembly 360 can also supply power to the lighting system 200. The power board assembly 324 can be an optional component and the node can receive power directly from the lighting driver of the lighting fixture 200. In addition, the control system 600 includes a base housing 640 which directly connects to the lighting fixture 230 by a connection means such as screws. Therefore, a connector (e.g., a NEMA connector) is not required to perform the connection between the control system 600 and the outdoor lighting system 200 in this embodiment.

As further shown in FIG. 6, wires 650 are used to facilitate an electrical connection between the node and the lighting fixture 230. A photocell 670 is also provided between the circuit board 620 and the power board assembly 630 to perform ambient sensing. Alternatively, the photocell 670 can be positioned on either board 620 or the power board assembly 630.

The cover 610 is securely fitted into the base housing 640 in a snap fit or locking manner, to complete the external appearance of the control system 600.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system configured for mounting to a lighting fixture of an outdoor lighting system comprising:
    at least one port configured to receive power from the outdoor lighting system
    a sensor electrically coupled to the port; and
    a transparent cover (i) formed of a single element and including an interior area configured to house the port and the sensor, and (ii) configured to transmit signals therethrough for wireless communication with the outdoor lighting system.

2. The control system of claim 1, wherein the cover is translucent and/or tinted.

3. The control system of claim 1, wherein the cover is formed of a polymeric material.

4. The control system of claim 1, further comprises:
    a first circuit board including a network interface unit to perform communication with an external system; and
    a second circuit board connected with the first circuit board and including the sensor and at least one processing unit for performing calculations using information from the outdoor lighting system.

5. The control system of claim 4, wherein the second circuit board further includes a plurality of light emitting diodes configured to indicate a state of the control system and a driver configured to control the light emitting diodes.

6. The control system of claim 5, wherein the second circuit board is configured to perform auto detection to detect if a driver of the outdoor lighting system comprises a 0-10 Volt protocol or a digital addressable lighting interface (DALI) interface.

7. The control system of claim 4, further comprising: a power board assembly comprising:

a power interface including a relay for completing a circuit with the fixture and operating as a controller to turn on and off the fixture of the outdoor lighting system.

8. The control system of claim 4, further comprising:
a base portion to enclose the first circuit board, second circuit board and the power board assembly of the control system and configured to be securely fitted to the cover.

9. The control system of claim 4, wherein the first circuit board and the second circuit board are combined into a single circuit board.

10. The control system of claim 9, wherein the single circuit board and the power board assembly form a printed circuit board (PCB) stack within the cover.

11. A method for obtaining a color appearance during control of an outdoor lighting system having a fixture, wherein a control system is mounted to the fixture, the method comprising:
providing an at least partially transparent cover (i) formed of a single element and including an interior area configured to house a sensor, and (ii) for housing a sensor for performing sensing with the outdoor lighting system; and
performing ambient sensing and wireless communication by transmitting signals through the cover and wirelessly connecting the control system to the outdoor lighting system to receive and transmit data from the outdoor lighting system.

12. The method of claim 11, further comprises:
providing a first circuit board within the cover including a network interface unit; and
providing a second circuit board connected with the first circuit board and including the sensor for performing sensing.

13. The method of claim 11, further comprising: controlling the outdoor lighting system via a microcontroller/processing unit within the cover.

14. The method of claim 13, further comprising:
receiving, through the cover, data from the outdoor lighting system via an optional wireless data source of the outdoor lighting system.

15. The method of claim 14, wherein the wireless data source is a radiofrequency (RF) source.

16. The method of claim 15, further comprising:
communicating, through the cover, with an external system for obtaining ambient sensing data to monitor and control the outdoor lighting system.

17. A cover formed at least partially transparent for a control system of an outdoor communication system, the cover comprising a transparent colored polymeric based material configured to transmit signals therethrough from a wireless node housed therein,
and further comprising:
an upper portion for housing a first circuit board including a network interface unit and a second circuit board connected with the first circuit board and including the at least one sensor and at least one processing unit to perform calculations using information from the outdoor communication system;
a middle portion for housing a power board assembly configured to control and on and off state of the fixture of the outdoor communication system; and
a bottom portion for housing a connector to connect the control system to the outdoor communication system.

* * * * *